Inventor
George W. Batchell
By [signature]
Attorney

Nov. 12, 1935.　　　　G. W. BATCHELL　　　　2,020,760
PORT STRUCTURE FOR FURNACES
Filed May 7, 1935　　　6 Sheets-Sheet 4
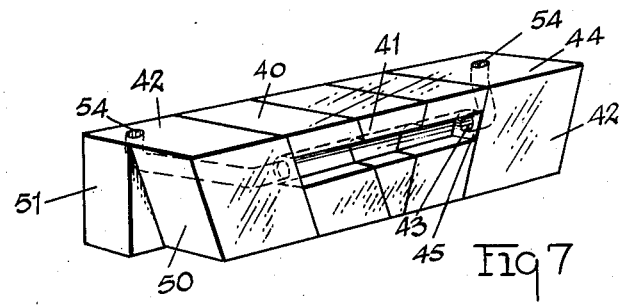
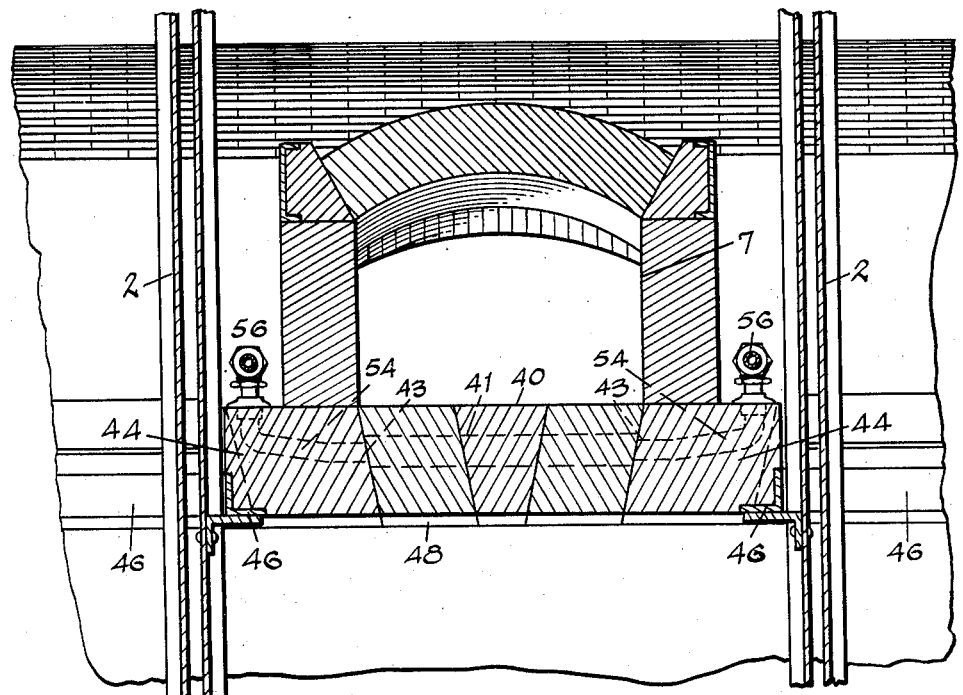
Inventor
George W. Batchell
By Faust F. Crampton
Attorney Nov. 12, 1935.  G. W. BATCHELL  2,020,760
PORT STRUCTURE FOR FURNACES
Filed May 7, 1935  6 Sheets-Sheet 5

Inventor
George W. Batchell
By Faust T. Crampton
Attorney

Nov. 12, 1935.  G. W. BATCHELL  2,020,760
PORT STRUCTURE FOR FURNACES
Filed May 7, 1935   6 Sheets-Sheet 6
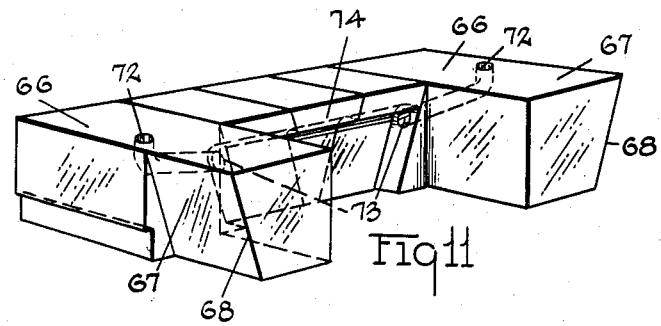
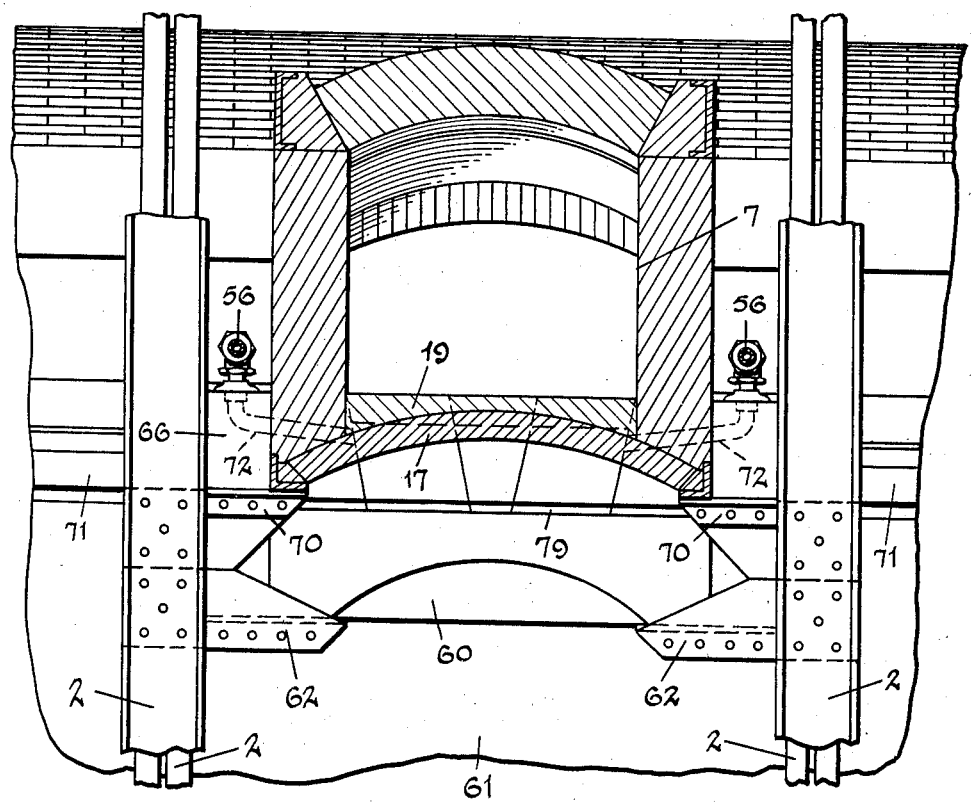
Inventor
George W. Batchell
By [signature]
Attorney Patented Nov. 12, 1935

2,020,760

UNITED STATES PATENT OFFICE 2,020,760

PORT STRUCTURE FOR FURNACES

George W. Batchell, Toledo, Ohio

Application May 7, 1935, Serial No. 20,281

11 Claims. (Cl. 263—15)

My invention has for its object to produce an air and fuel port structure of a glass furnace having means for supporting the port structure independent of the wall structures of the furnace whereby the furnace wall surrounding the port may be removed and replaced or repaired without disturbing the port structure, and also whereby the wall of the port and the parts of the furnace in the vicinity of the port may be efficiently exteriorly air cooled.

The invention also provides a port structure in a glass furnace whereby the fuel port part of the structure is disposed with reference to the secondary air port structure as to produce a stratified formation of the air and fuel gas streams as they are directed into and across the furnace.

The invention also provides a self-supporting port structure for glass for directing the fuel gas and the air into the furnace from within the area of the port and disposing the fuel gas inlet remote from the plane of the outlet of the port into the furnace to enable cracking down of the fuel gas in advance of its entry into the furnace to produce a highly heat radiant flame.

The invention consists in other features which will appear from the following description and upon examination of the drawings. To illustrate a practical application of the invention I have selected a port structure for glass furnaces as an example of the various structures and the details of such structures that contain the invention and shall describe the selected structure hereinafter. The particular structure selected is shown in the accompanying drawings.

Figure 1:
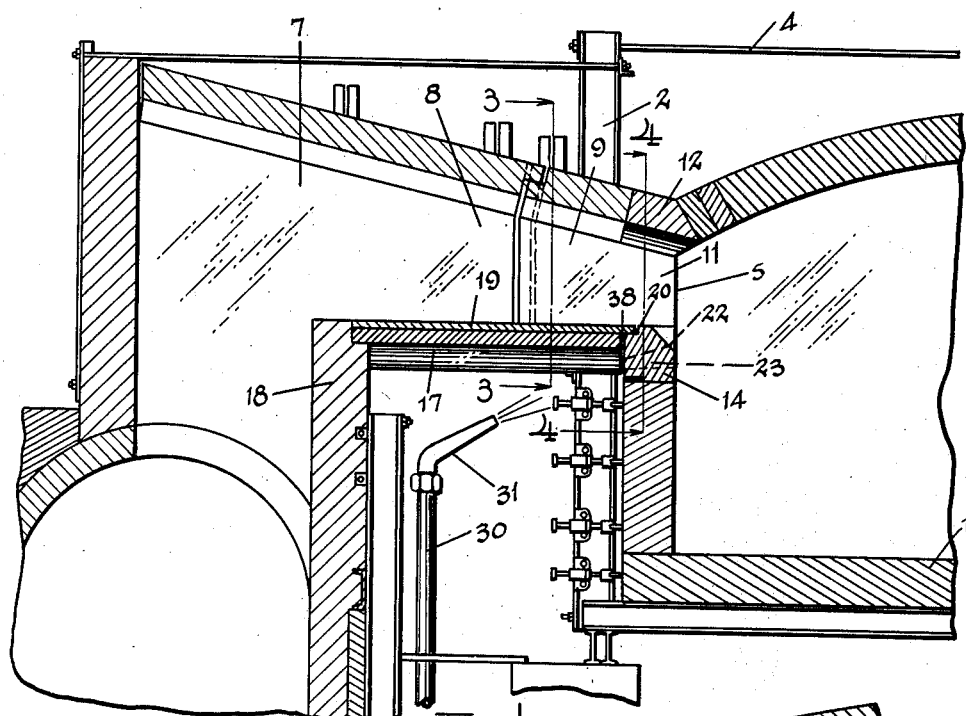
Figure 2:
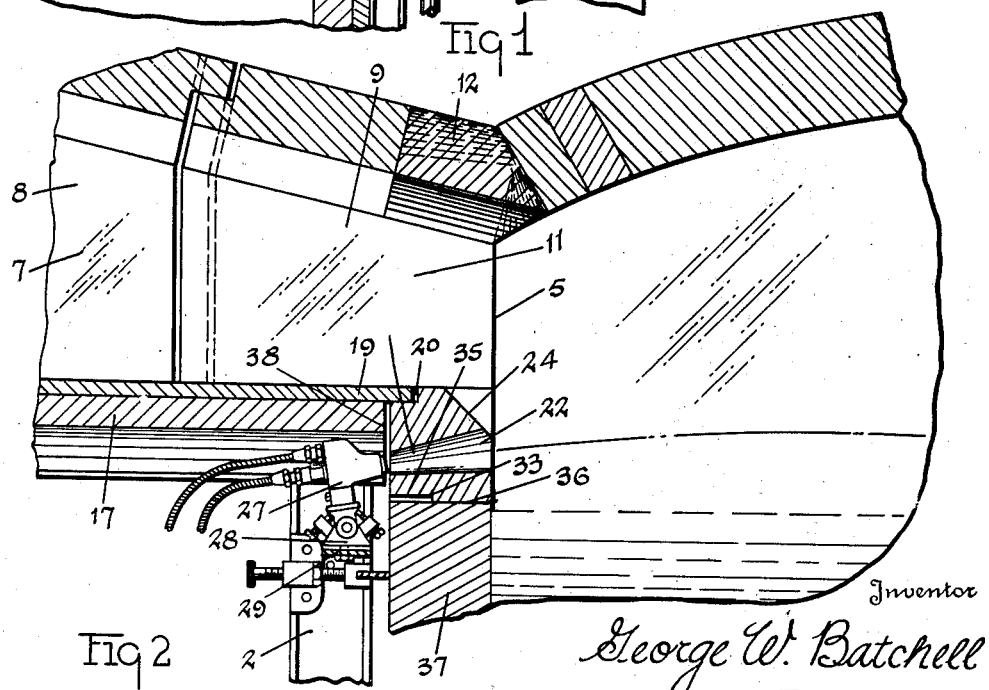
Figure 3:
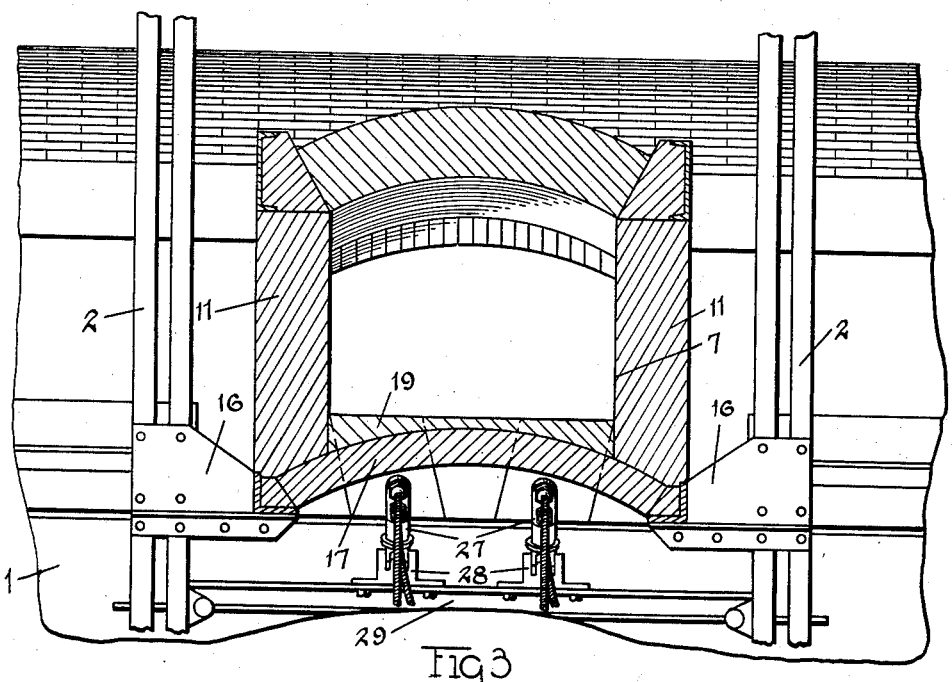
Figure 4:
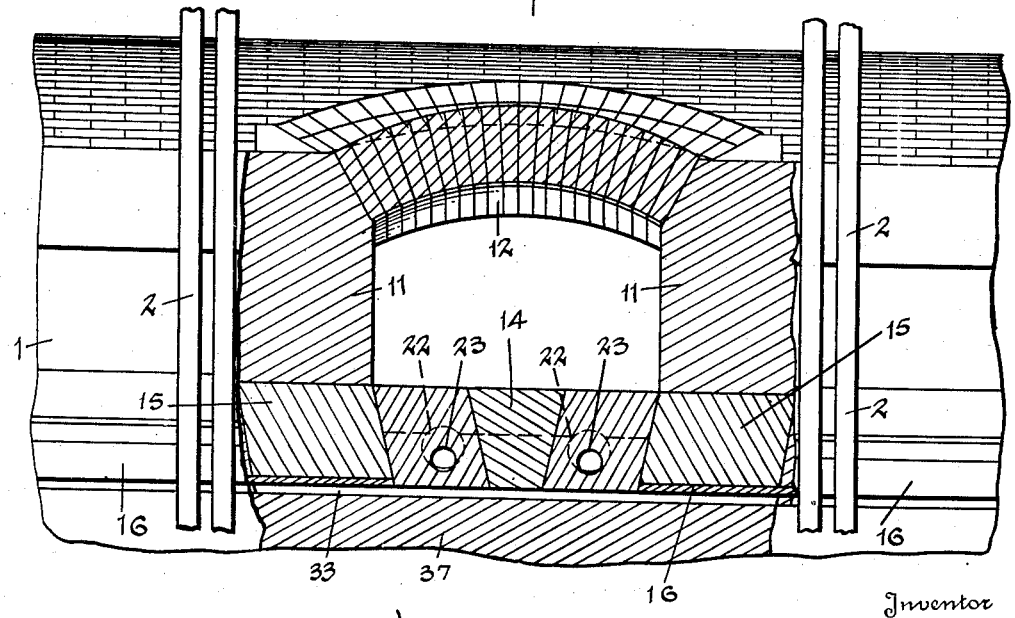
Figure 5:
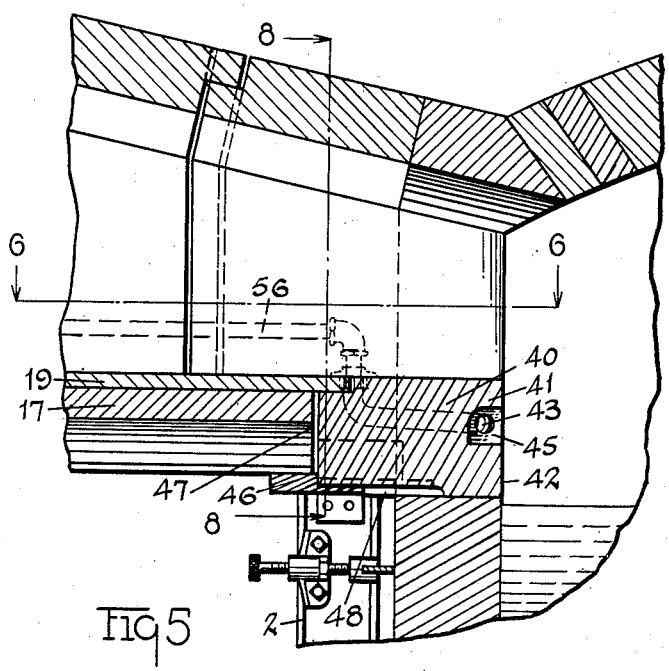
Figure 6:
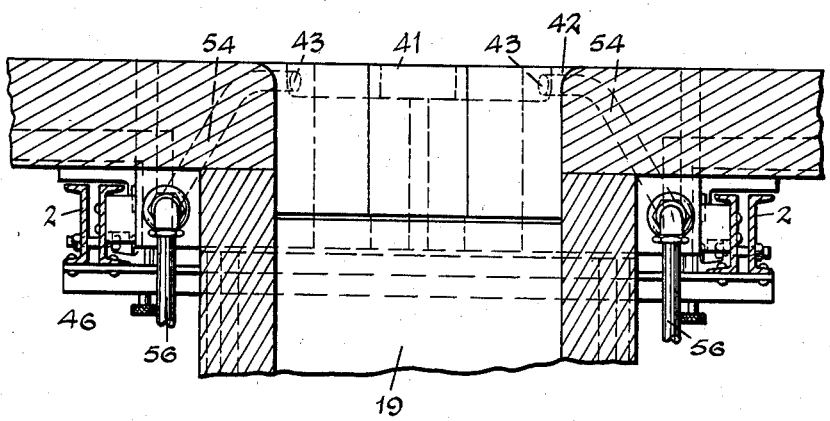
Figure 9:
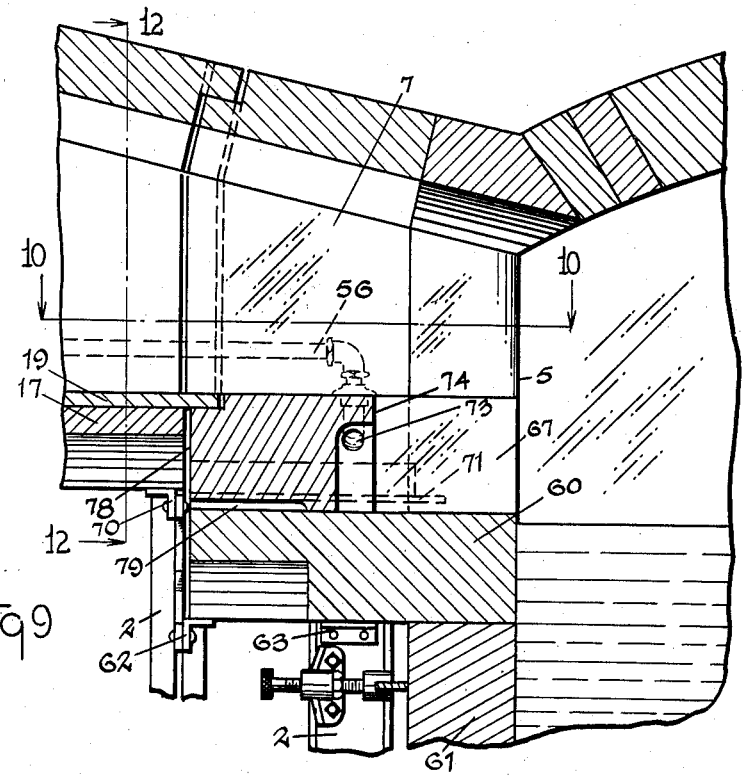
Figure 10:
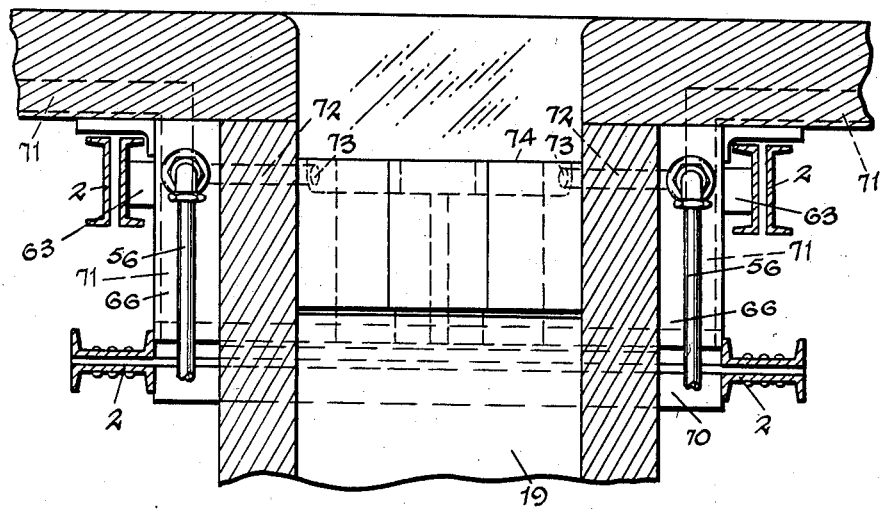

Fig. 1 illustrates a view of a section through one of the air ports of the furnace. Fig. 2 illustrates a part of the structure illustrated in Fig. 1 somewhat enlarged to illustrate the details of the part shown. Fig. 3 is a view of a section taken on the plane of the line 3—3 indicated in Fig. 1. Fig. 4 is a view of a section taken on the plane of the line 4—4 indicated in Fig. 1. Fig. 5 is a view of a section through a modified form of the port construction. Fig. 6 is a view of a section taken on the plane of the line 6—6 indicated in Fig. 5. Fig. 7 illustrates a perspective view of a structure suporting jack-arch illustrated in Figs. 5 and 6. Fig. 8 is a view of a section taken on the plane of the line 8—8 indicated in Fig. 5. Fig. 9 illustrates a further modification of the port construction illustrated in Figs. 1 and 5. Fig. 10 is a view of a section taken on the plane of the line 10—10 indicated in Fig. 9. Fig. 11 illustrates a perspective view of the jack-arch illustrated in Fig. 9. Fig. 12 is a view of the section taken on the plane of the line 12—12 indicated in Fig. 9.

In the regenerative furnace illustrated in the drawings, the furnace 1 is provided with the usual buck stays 2 that are tied by rods 4 for laterally supporting the walls of the furnace, particularly as against expansion in the manner well known in the art. The furnace is provided with a plurality of ports 5 located in opposite side walls of the furnace for the admission of air and gas to produce flames that cover the surface of the glass as the streams progress across the furnace. The ports 5 on one side of the furnace form the inlet ports, and the ports 5 on the opposite side of the furnace form the exhaust ports during each alternate period in which checker-work on one side is heated, and in the intermediate periods the gas movement is reversed and checker-work on the other side of the furnace is heated in the manner well known in the art. The walls of each air passageway 7 leading to the ports 5 are formed of a plurality of refractory blocks, and the passageways on each side of the furnace connect with the checker-work chamber to direct exhaust gases that heat checker-work or air heated by the checker-work into the furnace through the ports 5.

The outlet end structure of each air passageway 7 is preferably formed of overlapping end portions 8 and 9 having corresponding edges located in spaced relation to each other to allow for the difference in expansion of the portion 9 which is connected to the furnace wall and the portion 8 that constitutes the body portion of the air passageway structure. The part of the port structure that terminates in the port 5 located in the plane of the side wall of the port is formed of suitable side blocks 11 and a plurality of key blocks 12 that form an arcuate end part of the top of the air passageway structure, a form of construction not uncommon in glass furnaces.

In the form of construction shown in Fig. 1, the bottom of the port is formed by the jack-arch 14 consisting of a plurality of blocks whose top and bottom surfaces are located in common planes and whose lateral contiguous surfaces slope relative to each other to key and support the blocks intermediate the end blocks of the jack-arch, the ends of the jack-arch being supported laterally and vertically to support the weight of one of the air passageway structures.

The end blocks 15 laterally abut and are supported on the brackets 16 that are connected to certain of the buck stays 2 that support the side wall of the furnace.

An arcuate refractory plate 17 is supported on one end by a wall 18 forming a part of the wall of the chamber that contains the checkerwork, and the other end of the refractory plate 17 is supported on the brackets 16. One end of the refractory plate 17 is located in proximity to the outer side of the jack-arch 14, the end of the plate being preferably located in spaced relation with respect to the outer side of the jack-arch. Above the refractory plate 17 is located a refractory material that may be formed of blocks or of a single refractory member 19 forming a flooring of the air passageway 7. The sides and the bottom of the passageway structure 7 are supported on the curved refractory plate 17.

The refractory member 19 or bottom wall of the passageway structure is also preferably located in spaced relation at one end with respect to the side of the jack-arch 14. Preferably the end of the refractory member 19 overhangs a part of the jack-arch 14 and is located in a recess 20 formed in the jack-arch 14 to locate the upper surface of the refractory plate 19 in spaced relation with respect to the corresponding edge of the jack-arch 14 and so as to locate the upper surfaces of the member 19 flush with the surface of the jack-arch 14.

The lower side of the refractory plate 17 curves concavedly so as to locate the center part of the end of the refractory plate 17 near the top of the jack-arch 14. The jack-arch 14 is provided with a plurality of fuel inlet ports 22 located below the central part of the end of the refractory plate. The center line of the passageways 23 leading the said ports 22 approximates the horizontal and in parallelism with the surface of the glass and at an angle to the surface of the glass preferably not exceeding 12 degrees. The jack-arch 14 is provided with an inclined surface 24 that slopes downwardly and inwardly with respect to the furnace to enable a downward flare of the air stream as it enters the port 5 and towards the gas streams and flames that are directed through the passageways 23 formed in the jack-arch.

Suitable burners 27 of the type commonly used in glass furnaces are supported on a plate 28 that in turn is supported on suitable brackets 29 connected to the buck stays that also support the jack-arch 14 and the curved plate 17.

The curved plate 17 thus enables the location of the ports 22 in close proximity to the lower edge of the inner end of the air passageway structure and in close proximity to the edge of the port 5 and, by reason of its shape, forms a relatively thin and yet a rigid wall supporting structure. It also enables the location of the passageways 23 that lead to the ports 22 in position such as to direct the flame from the burner 27 in a direction closely approximating the direction of the movement of the air across the furnace.

The upper surface of the air passageway 7 is diagonally disposed with reference to the bottom 19 of the air passageway and diagonally directs at a very small inclination to the horizontal the air stream that passes through the passageway in a downward direction as it leaves the port 5. The fuel passageways 23 are inclined upward at a slight angle. The inclined surfaces of the air and fuel passageways are such as to produce progressive diffusion across the surface of the glass and corresponding progressive flame propagation.

The jack-arch in which the ports 22 are located and the parts of the furnace located in vicinity thereto become highly heated by the flame that is projected from the jack-arch, and, for the preservation of the jack-arch, air is directed against the concave surface of the outside of the refractory plate 17 and the outside surface of the jack-arch 14. The plate being curved affords not only a rigid support for sustaining the weight of the structure of the air passageway, but also exposes the outside surface of the jack-arch and coacts to direct a stream of cooling air against the jack-arch to keep the jack-arch at a relatively low temperature and thereby greatly extend its life. A pipe 30 is connected with a suitable source of supply of air under pressure, and one or more nozzles 31 are connected to the pipe for directing an air stream against the surfaces of the plate 17 and the jack-arch 14, particularly in the region of the ports 22 to cool not only the jack-arch, but parts of the furnace located underneath the structure of the air passageway. It operates to keep the exterior temperature underneath the air passageway structure down and substantially the same as that of the furnace wall remote from the passageway.

As a further aid to the cooling of the jack-arch, a slot 33 is formed between the wall of the furnace and the jack-arch. The slot 33 may be formed by forming a surface 35 raised above a bottom surface 36 of the jack-arch so that when the under part 37 of the wall is placed in position with reference to the jack-arch or the jack-arch is located on the said part 37 of the wall, the outer side of the wall forms an opening 33 into which the air current will penetrate by its pressure and thus coact to reduce the temperature of the jack-arch. Also, the end of the refractory plate 17 is located in spaced relation with respect to the side surface of the jack-arch forming a slot 38 into which the air currents will also penetrate.

The level of the melted glass in the furnace is just below the lower edge of the jack-arch. The heat and the convection of the melted glass causes erosion of the refractory blocks of the side wall of the furnace, particularly those parts of the side wall of the furnace below the port structures. The refractory plate and the jack-arch of each port being supported independently of the furnace wall, the wall blocks may be removed and the wall rebuilt without disturbing the port structures.

Where it is desired to substantially completely cover the glass surface with the gas streams and produce stratified arrangement of the fuel gas and the air in the furnace, the jack-arch may be provided with an overhanging ledge beneath which the fuel gas is directed in a manner to spread the fuel gas over an area substantially the same as that covered by the introduction of the air stream through the passageway. The jack-arch is so formed as to produce a flame at the port 5 substantially the same width as the port.

In the form of construction illustrated in Figs. 5, 6, 7, and 8, the blocks of the jack-arch 40 are so formed as to have a ledge 41 and protruding end parts 42. Fuel ports 43 are located in the end blocks 44 and in the planes of the inner or opposed lateral surfaces 45 of the protruding end parts 42 and thus open into the furnace in directions such as to initially direct the gas flow from each of the protruding end parts 42 towards the opposite end part. The gas stream, however, by the reaction between the two currents, operates to spread the fuel and the gas and cause the gas to move over and cover the same area of the glass surface that is covered by the air stream that issues from the air passageway through the port 5.

The jack-arch 40 abuts and is supported on the brackets 46 that are connected to certain of the buck stays 2 located on opposite sides of the port structure of the furnace. The curved refractory plate 17 is of the form shown in the structure illustrated in Figs. 1 to 4 and is similarly supported on the brackets 46. The curved refractory plate 17 is preferably disposed in spaced relation with respect to the jack-arch to afford a cooling space 47 on the lateral surface of the jack-arch, and also the jack-arch and the side wall of the furnace are provided with a slot 48 to enable maintaining the jack-arch at as low a temperature as possible, air flow being produced towards the jack-arch by a nozzle 31, such as is shown in Fig. 1.

Preferably the end blocks 44 are provided with the inclined surfaces 50 for keying the jack-arch with the blocks of the side wall of the furnace. The end blocks 44 are also provided with the vertical surfaces 51 that abut the brackets 46, the outer side portion of the jack-arch preferably overhanging the outside surface of the wall part 37 of the furnace.

The fuel passageways 54 extend from the ends of the overhanging portion of the jack-arch through the end blocks 44 of the jack-arch to the fuel ports 43 formed in the lateral surfaces 45. The passageways 54 are connected to a suitable source of supply of fuel gas under pressure by means of the fuel pipes 56.

Thus, in the form of construction illustrated in Figs. 5 to 8, the under wall 37 may be entirely removed and new blocks formed in the wall may be inserted in place of those that have been eroded by continued operation of the furnace.

In the form of construction illustrated in Figs. 9 to 12, inclusive, the inner side of the jack-arch is located remote from the port opening 5 to afford preliminary cracking of the fuel gas in advance of its entrance into the furnace through the port.

Thus, the furnace may be provided with a refractory block 60 or a plurality of keyed blocks, disposed upon the portion of the side wall 61 located beneath the structure having the air passageway. The block 60 or a plurality of keyed blocks, if used, overhang the outer side of the portion 61 of the side wall of the furnace. The outer end of the block 60 may be supported on the brackets 62 and 63 connected to buck stays 2, while the lower side of the inner end with respect to the furnace is located in contact with the blocks that form the portion 61 of the side wall of the furnace.

Preferably, the jack-arch is provided with end blocks 66 that have protruding portions 67, the portions 67 being provided with sloping lateral surfaces 68 that key with the blocks of the side wall of the furnace. The end blocks abut and are supported on the brackets 70 and 71 secured to the buck stays 2. Fuel passageways 72 are also formed in the end blocks 66 and extend to the ports 73 formed in the opposed lateral surfaces of the end blocks 66. The ports 73 are located below the ledge 74 that extends a length substantially the same width of the air passageway 7. The fuel passageways 72 are connected by means of pipes 56 with the source of supply of fuel gas.

The refractory plate 17 is disposed with reference to the jack-arch in a manner similar to that shown in Figs. 1 to 6, inclusive, and slots 78 between the end of the refractory plate 17 and the side of the jack-arch are formed by the displaced relation of the end of the plate 17 with respect to the side of the jack-arch, and also the slot 79 is formed intermediate the block 60 and the outer side portion of the jack-arch to provide for the circulation of air over a large area of the surface of the jack-arch to maintain its temperature at as low a point as possible, the structure being provided with the nozzle 31 that is connected to the source of supply of air under pressure by means of the pipes 30 to maintain these parts at a relatively low temperature as in the form of construction illustrated in Fig. 1.

The level of the glass 7 in the furnace is near the inner upper end of the refractory block 60, and consequently the inner end is subject to the erosion, though not to so marked a degree as the side wall of the furnace, and may be, if desired, torn out with the side wall from beneath the jack-arch, it being supported independent of the jack-arch by the brackets 62 and 63. The under portion 61 may be removed without removing the blocks 60.

I claim:

1. In a glass furnace, a plurality of buck stays for laterally supporting the walls of the furnace, brackets connected to certain of the buck stays, a jack-arch, the ends of the jack-arch supported on and abutting the brackets, a curved refractory plate supported on the brackets, a plurality of refractory blocks supported on the curved refractory plate and the jack-arch and forming the walls of an air passageway, the jack-arch located below the air passageway and having a fuel port for directing the fuel gas in a line approximating parallelism with the air flow and the surface of the glass.

2. In a glass furnace, a plurality of buck stays for laterally supporting the walls of the furnace, a jack-arch, a curved refractory plate supported on the brackets, one end of the plate located in proximity to one side of the jack-arch, the central part of the said plate located near the top of the central part of the jack-arch, an air passageway structure comprising a plurality of refractory blocks, the structure formed to have two parts located above the said plate, the contiguous end edges of the said parts overlapped and spaced from each other, the air port having a flooring part of refractory material and supported on the plate and having an end edge part located flush with the top surface of and spaced from the jack-arch, the jack-arch and the refractory material forming the bottom side wall of the air passageway.

3. In a glass furnace a plurality of buck stays for laterally supporting the walls of the furnace, brackets connected to certain of the buck stays, a jack-arch, the ends of the jack-arch abutting and supported on the brackets, a curved refractory plate supported on the brackets, one end of the plate located in proximity to one side of the jack-arch, the central part of the end of the the plate located near the top of the central part of the jack-arch, an air passageway structure supported on the plate and the jack-arch, the jack-arch having a fuel port located below the level of the central part of the plate, the bottom part of the air passageway having an upper surface flush wtih the top surface of the jack-arch.

4. In a glass furnace, a plurality of buck stays for laterally supporting the walls of the furnace, brackets connected to certain of the buck stays, a jack-arch, the ends of the jack-arch abutting and supported on the brackets, a curved refractory plate supported on the brackets, one end of the plate located in proximity to one side of the jack-arch, the central part of the said end located near the top of the central part of the jack-arch, the jack-arch having a fuel port, a source of supply of air under pressure, and means for directing air towards the end of the plate and the side of the arch for cooling the said parts and the parts of the furnace located in vicinity thereto.

5. In a glass furnace a plurality of buck stays for laterally supporting the walls of the furnace, brackets connected to certain of the buck stays, a jack-arch, the ends of the jack-arch abutting and supported on the brackets and extending into the wall of the furnace, the jack-arch having a fuel port, the lower side of the jack-arch having a recessed part forming a slot between the lower side of the jack-arch and the wall of the furnace, a source of supply of air under pressure, and means for directing air towards the slot and the wall of the furnace for cooling the said parts and parts of the furnace located in vicinity of the plate and the jack-arch.

6. In a glass furnace, a plurality of buck stays for laterally supporting the walls of the furnace, brackets connected to certain of the buck stays, a jack-arch, the ends of the jack-arch abutting and supported on the brackets, a curved refractory plate supported on the brackets, one end of the plate located in proximity to and spaced from one side of the jack-arch, the central part of the end of the plate located near the top of the central part of the jack-arch, the jack-arch having a fuel port extending therethrough at a point below the plate, the lower side of the jack-arch having a recessed part forming a slot between the lower side of the jack-arch and the wall of the furnace, a source of supply of air under pressure, and means for directing air towards the slot and the wall of the furnace for cooling the said parts, and parts of the furnace located in the vicinity of the plate and the jack-arch.

7. In a glass furnace, a plurality of buck stays for laterally supporting the walls of the furnace, brackets connected to certain of the buck stays, a jack-arch, the ends of the jack-arch abutting and supported on the brackets, the blocks of the jack-arch having a protruding ledge, and the ends of the blocks having protruding side parts, the ends of the side parts located flush with the inside surface of the furnace, and fuel passageways extending through the protruding side parts and having end parts extending towards the opposite side parts and terminating in fuel ports opening into the furnace beneath the said ledge.

8. In a glass furnace, a plurality of buck stays for laterally supporting the walls of the furnace, a plurality of refractory blocks forming an air passageway terminating in a port opening located in the plane of the inside surface of the wall of the furnace, brackets connected to certain of the buck stays, a jack-arch, the ends of the jack-arch abutting and supported on the brackets, a curved refractory plate supported on the brackets, the end of the plate located in proximity to one side of the jack-arch, the curved plate and the jack-arch supporting the blocks forming the air passageway, the jack-arch having a fuel outlet for directing fuel gas into the passageway below the air stream and at a point remote from the port.

9. In a glass furnace, a plurality of refractory blocks forming an air passageway structure terminating in a port opening in the plane of the inside surface of the wall of the furnace, a jack-arch for supporting one end of the air passageway structure, a plurality of buck stays for laterally supporting the walls of the furnace, certain of the buck stays having brackets for supporting the jack-arch, the jack-arch having a ledge overhanging the fuel ports, and a passageway for directing fuel into the area of the port below the air flow in the said passageway and located below the said ledge, the edge of the said ledge located remote from the said plane of the inside surface of the furnace and the said port to permit cracking of the fuel gas in advance of the entrance of the fuel gas into the furnace through the port.

10. In a glass furnace, a plurality of buck stays for laterally supporting the wall of the furnace, blocks overhanging the outside surface of the furnace and located on the side wall, a jack-arch located above the outer end portions of the said blocks, a curved refractory plate having one end located near the outer side surface of the jack-arch, blocks supported on the said refractory plate and said jack-arch and forming an air passageway and forming with the first-named blocks a port opening in the plane of the inside surface of the furnace, means connected to certain of the buck stays for supporting the blocks, the plate, and the jack-arch, the jack-arch having an overhanging ledge and protruding side parts extending toward the port and fuel inlets extending through the side parts and opening into the passageway beneath the said ledge for directing fuel into the furnace beneath the air stream at a point remote from the plane of the inside surface of the furnace.

11. In a glass furnace, a plurality of buck stays for laterally supporting the walls of the furnace, brackets connected to certain of the buck stays, the furnace having a burner chamber, a jack arch formed of a plurality of interfitting blocks located at the inner lower end edges of the burner chamber for supporting the ends of the side walls on the top of the burner chamber, the ends of the jack arch abutting and supported on the brackets, the contiguous blocks of the jack arch having a ledge protruding substantially horizontally toward the interior of the furnace, certain of the said blocks having fuel ports opening beneath the said ledge for introducing fuel into the furnace at the lower end of the burner chamber contiguous to the furnace, whereby the burner chamber may be independently supported and the wall part of the furnace beneath the burner chamber may be removed and replaced.

GEORGE W. BATCHELL.